US012798643B2

(12) United States Patent
Wu

(10) Patent No.: US 12,798,643 B2
(45) Date of Patent: Nov. 17, 2026

(54) SHEAFLIKE FOLDING CART

(71) Applicant: Wuyi Migo Leisure Products Co., Ltd., Jinhua (CN)

(72) Inventor: Peiwu Wu, Wuhu (CN)

(73) Assignee: Wuyi Migo Leisure Products Co., Ltd., Jinhua (CN)

( * ) Notice: Subject to any disclaimer, the term of this patent is extended or adjusted under 35 U.S.C. 154(b) by 194 days.

(21) Appl. No.: 18/979,346

(22) Filed: Dec. 12, 2024

(65) Prior Publication Data

US 2026/0084736 A1 Mar. 26, 2026

(30) Foreign Application Priority Data

Sep. 26, 2024 (CN) ......................... 202422357319.1

(51) Int. Cl.

*B62B 3/00* (2006.01)
*B62B 3/02* (2006.01)
*B62B 5/06* (2006.01)

(52) U.S. Cl.

CPC .............. *B62B 3/007* (2013.01); *B62B 3/025* (2013.01); *B62B 5/065* (2013.01); *B62B 2205/06* (2013.01)

(58) Field of Classification Search

CPC ......... B62B 3/007; B62B 3/025; B62B 5/065; B62B 5/067; B62B 7/086; B62B 2205/06; B62B 2205/02

See application file for complete search history.

(56) References Cited

U.S. PATENT DOCUMENTS 12,157,512 B1 * 12/2024 Jiang ......................... B62B 3/02
2015/0145224 A1 * 5/2015 Zhu ......................... B62B 3/007 280/42
2021/0107549 A1 * 4/2021 Wang ...................... B62B 3/007
2024/0051589 A1 * 2/2024 Zhou ..................... B62B 5/0438
2025/0018989 A1 * 1/2025 Zhang ..................... B62B 3/002
2025/0242848 A1 * 7/2025 Cheng ..................... B62B 5/067
2026/0008489 A1 * 1/2026 Zhang ..................... B62B 3/007

FOREIGN PATENT DOCUMENTS

CN 110803206 A 2/2020
CN 210822341 U 6/2020
CN 218229049 U * 1/2023
CN 219406494 U 7/2023

* cited by examiner

*Primary Examiner* — Steve Clemmons
(74) *Attorney, Agent, or Firm* — George D. Morgan

(57) ABSTRACT

The present invention discloses a sheaflike folding cart. The sheaflike folding cart includes a cart frame body and a wheel body assembly. The cart frame body includes a front shear fork group, a rear shear fork group, a left shear fork group, a right shear fork group, a first support stand column, second support stand columns, third support stand columns, and an underframe structure; two groups of second and third support stand columns are arranged oppositely, and the underframe structure includes a first underframe assembly, a second underframe assembly, a third underframe assembly and a fourth underframe assembly; and the third underframe assembly is provided with a second connecting member, a fourth mounting member, and a fourth bottom rod with two ends rotatably connected to the second connecting member and the fourth mounting member respectively.

10 Claims, 14 Drawing Sheets

SHEAFLIKE FOLDING CART

CROSS-REFERENCE TO RELATED APPLICATIONS

The application claims priority to Chinese patent application No. 2024223573191, filed on Sep. 26, 2024, the entire contents of which are incorporated herein by reference.

TECHNICAL FIELD

The present invention relates to the field of carts, and in particular, to a sheaflike folding cart.

BACKGROUND

A cart is mainly used for people to handle items during camping. Due to its large accommodation space, foldability, and ease of storage in a car trunk or at the corner of a house, the cart is becoming more and more popular among contemporary people.

There are mainly two folding methods for the cart frame of an existing cart. One is plate-type folding: for a cart featuring plate-type folding, the left and right sides of the cart are provided with shear fork structures that can be deformed and folded; the front and rear sides of the cart are provided with pallet side rails; and the bottom of the cart mainly includes two pallet base supports hinged to each other. When the whole cart is folded, the shear fork structures on the left and right sides are deformed and approach each other, which drives the front and rear pallet side rails to approach each other, and drives the two pallet base supports to rotate upward to fold. This folding structure has a strong load capacity, but occupies a large space after folding. The other is sheaflike folding: for a cart featuring sheaflike folding, the front, rear, left and right sides are all arranged as shear fork structures, and the bottom mainly includes a single intersecting component. When the whole cart is folded, the shear fork structures on the front, rear, left and right sides are deformed and approach each other, and meanwhile drive the center of the single intersecting component to rotate upward for contracting. This folding structure occupies little space after folding, but has a poor load capacity because its bottom only includes a single intersecting component. Moreover, the carts featuring the above two folding methods have a small distance between front and rear side rails, which is not suitable for carrying some long items, causing inconvenience to people.

SUMMARY

In view of the shortcomings in the prior art, the present invention provides a sheaflike folding cart. The sheaflike folding cart not only has a long storage space to carry some long items, but also occupies small space after being folded, which makes it convenient to store and carry. In addition, the cart has strong load capacity, and is thus highly practical in use.

The sheaflike folding cart of the present invention includes a cart frame body and a wheel body assembly for driving the cart frame body to move, where the cart frame body includes a front shear fork group, a rear shear fork group, a left shear fork group, and a right shear fork group, and also includes a first support stand column rotatably connected to end portions of two adjacent shear fork groups, a second support stand column rotatably connected to the left shear fork group, a third support stand column rotatably connected to the right shear fork group, and an underframe structure connected between lower portions of each first support stand column, second support stand column and the third support stand column; the second support stand columns and the third support stand columns are oppositely arranged in two groups, and the underframe structure includes a first underframe assembly disposed between lower portions of one of the second support stand columns and one of the third support stand columns oppositely arranged, and lower portions of the first support stand columns at two ends of the front shear fork group, a second underframe assembly disposed between lower portions of the other of the second support stand columns and the other of the third support stand columns oppositely arranged, and lower portions of the first support stand columns at two ends of the rear shear fork group, and a third underframe assembly disposed between the first underframe assembly and the second underframe assembly; and the first underframe assembly and the second underframe assembly are each provided with a second bottom rod rotatably connected to the lower portion of the second support stand column and a third bottom rod rotatably connected to the lower portion of the third support stand column, the third underframe assembly is provided with a second connecting member, a fourth mounting member respectively connected to the second bottom rod and the third bottom rod, and a fourth bottom rod with two ends rotatably connected to the second connecting member and the fourth mounting member respectively, and when the sheaflike folding cart is driven to fold, the front, rear, left, and right shear fork groups are deformed to drive the first support stand columns, the second support stand columns, and the third support stand columns to contract, and the second bottom rod, the third bottom rod, and the fourth bottom rod contract to drive the second connecting member to move upward.

Preferably, the second connecting member is provided with four second connecting portions respectively used for connecting the four fourth bottom rods, each second connecting portion includes two second connecting side plates arranged oppositely in a longitudinal direction and a second connecting top plate connected between upper portions of the two second connecting side plates, the two second connecting side plates and the second connecting top plate enclose a second connecting groove for arrangement of one end of the fourth bottom rod, and the second connecting side plate is rotatably connected to the fourth bottom rod through a second connecting shaft.

Preferably, the second connecting portion also includes a second limiting member fixedly connected to an inner side of the second connecting groove, the second limiting member includes second limiting plates respectively arranged on inner sides of the two second connecting side plates, and a second limiting portion connected between upper portions of the two second limiting plates, the second limiting portion is arranged at one end of the second connecting side plate close to the support stand column, the second connecting shaft is arranged at one end of the second connecting side plate away from the support stand column, the second limiting portion is provided with a third limiting surface at a bottom and a fourth limiting surface close to one side of the second connecting shaft, an outer side of the fourth bottom rod is provided with a third abutting surface and a fourth abutting surface arranged at intervals on one side of the third abutting surface away from the support stand column, when the sheaflike folding cart is driven to unfold, the third abutting surface can abut against the third limiting surface for limiting, and when the sheaflike folding cart is driven to fold, the fourth abutting surface is capable of abutting against the fourth limiting surface for limiting.

Preferably, the second connecting member includes a third connecting strip and a fourth connecting strip perpendicularly crossed with each other, a middle of the third connecting strip is provided with a first lower opening portion, a middle of the fourth connecting strip is provided with a first upper opening portion, the first lower opening connecting portion and the first upper opening connecting portion are in snap fit, after fit, a top surface of the third connecting strip and a top surface of the fourth connecting strip are located on a same plane and form a bearing support surface for abutting against a bottom of a cloth cover structure, and two ends of the third connecting strips and two ends of the four connecting strip are respectively formed into the second connecting portions.

Preferably, a length of the fourth bottom rod is less than a length of the second bottom rod and a length of the third bottom rod, the fourth mounting member is spaced from one end of the second bottom rod close to the second support stand column or one end of the third bottom rod close to the third support stand column, the fourth mounting member includes two fourth mounting side plates arranged oppositely in a longitudinal direction, and a fourth connecting side plate connected between ends of the two fourth mounting side plates away from the fourth bottom rod, the fourth connecting side plate is relatively fixedly connected to one side of the fourth bottom rod close to the second connecting member, the two fourth mounting side plates and the fourth connecting side plate enclose a fourth mounting groove for arrangement of one end portion of the fourth bottom rod, the fourth mounting side plate is rotatably connected with the fourth bottom rod through a fourth mounting shaft, and the fourth bottom rod is perpendicular to the second bottom rod or the third bottom rod through the fourth mounting member.

Preferably, the first underframe assembly and the second underframe assembly are further each provided with a first mounting member connected to the lower portion of each first support stand column, a second mounting member connected to the lower portion of each second support stand column, a third mounting member connected to the lower portion of each third support stand column, a first connecting member, and a first bottom rod with two ends rotatably connected to a lower side of the first connecting member and an upper side of the first mounting member respectively, two ends of the second bottom rod are rotatably connected to the lower side of the first connecting member and an upper side of the second mounting member respectively, two ends of the third bottom rod are respectively rotatably connected to the lower side of the first connecting member and an upper side of the third mounting member, and when the sheaflike folding cart is driven to fold, the first bottom rod, the second bottom rod, and the third bottom rod contract to drive the first connecting member to move upward.

Preferably, the first connecting member is provided with four first connecting portions respectively used for connecting the two first bottom rods, the second bottom rod and the third bottom rod, each first connecting portion includes two first connecting side plates arranged oppositely in a longitudinal direction and a first connecting top plate connected between upper portions of the two first connecting side plates, the two first connecting side plates and the first connecting top plate enclose a first connecting groove for arrangement of an end portion of the bottom rod, and the first connecting side plate is rotatably connected to the bottom rod through a first connecting shaft.

Preferably, the first connecting member includes a first connecting strip and a second connecting strip perpendicularly crossed with each other, a middle of the first connecting strip is provided with a lower opening portion, a middle of the second connecting strip is provided with an upper opening portion, the lower opening connecting portion and the upper opening connecting portion are in snap fit, after fit, a top surface of the first connecting strip and a top surface of the second connecting strip are located on a same plane and form a bearing support surface for abutting against a bottom of a cloth cover structure, and two ends of the first connecting strips and two ends of the second connecting strip are respectively formed into the first connecting portions.

Preferably, the first mounting member includes a first mounting base portion sleeving and being relatively fixed to the lower portion of the first support stand column, and a first mounting portion connected to one side of the first mounting base portion, the first mounting portion includes two first mounting side plates arranged oppositely in a longitudinal direction, and a first mounting bottom plate connected between lower portions of the two first mounting side plates, the two first mounting side plates and the first mounting bottom plate enclose a first mounting groove for arrangement of an end portion of the first bottom rod, and the first mounting side plates are rotatably connected with the first bottom rod through a first mounting shaft; and the second and third mounting members each include a second mounting base portion sleeving and being relatively fixed to the lower portions of the second and third support stand columns, and a third mounting portion connected to a side portion of the second mounting base portion, the third mounting portion includes two third mounting side plates arranged oppositely in a longitudinal direction, and a third mounting bottom plate connected between lower portions of the two third mounting side plates, the two third mounting side plates and the third mounting bottom plate enclose a third mounting groove for arrangement of end portions of the second and third bottom rods, and the third mounting side plates are rotatably connected with the second and third bottom rods through a third mounting shaft.

Preferably, the sheaflike folding cart further includes a cloth cover structure mounted in the cart frame body, where the left and right shear fork groups are provided with end shear fork brackets arranged on two ends thereof and an intermediate shear fork bracket arranged between the two end shear fork brackets; a third connecting structure is fixedly connected to an upper portion of the first support stand column, a fourth connecting structure is slidably connected to a lower portion of the first support stand column, upper portions of two ends of the front and rear shear fork groups, and upper portions of the ends of the end shear fork brackets of the left and right shear fork groups away from the intermediate shear fork bracket are rotatably connected with correspondingly arranged third connecting structures respectively, lower portions of two ends of the front and rear shear fork groups, and lower portions of the ends of the end shear fork brackets of the left and right shear fork groups away from the intermediate shear fork bracket are rotatably connected with correspondingly arranged fourth connecting structures respectively, the cloth cover structure is provided with a first mounting buckle arranged corresponding to the third connecting structure, an inner side of the third connecting structure is provided with a first quick-release buckle detachably connected with the first mounting buckle, and an outer side of the third connecting structure is provided with a second quick-release buckle for connecting accessories; and a fifth connecting structure is fixedly connected to upper portions of the second and third support stand columns, a sixth connecting structure is slidably connected to lower portions of the second and third support stand columns, upper portions of two ends of the intermediate shear fork bracket of the left and right shear fork groups, and upper portions of the ends of the end shear fork brackets close to the intermediate shear fork bracket are rotatably connected with correspondingly arranged fifth connecting structures respectively, and lower portions of two ends of the intermediate shear fork bracket of the left and right shear fork groups, and lower portions of the ends of the end shear fork brackets close to the intermediate shear fork bracket are rotatably connected with correspondingly arranged sixth connecting structures respectively.

According to the sheaflike folding cart in the present invention, the second support stand columns and the third support stand columns are oppositely arranged in two groups, and the underframe structure includes a first underframe assembly disposed between lower portions of one of the second support stand columns and one of the third support stand columns oppositely arranged, and lower portions of the first support stand columns at two ends of the front shear fork group, a second underframe assembly disposed between lower portions of the other of the second support stand columns and the other of the third support stand columns oppositely arranged, and lower portions of the first support stand columns at two ends of the rear shear fork group, and a third underframe assembly disposed between the first underframe assembly and the second underframe assembly. Compared with a cart without second and third support stand columns in the prior art, the length of the storage space of the cart frame body is greatly lengthened so that some longer items can be carried. In the meanwhile, the third underframe assembly is provided with a second connecting member, a fourth mounting member respectively connected to the second bottom rod and the third bottom rod of the first underframe assembly and the second underframe assembly, and a fourth bottom rod with two ends rotatably connected to the second connecting member and the fourth mounting member respectively, and when the sheaflike folding cart is driven to fold, the front, rear, left, and right shear fork groups are deformed to drive the first support stand columns, the second support stand columns, and the third support stand columns to contract, and the second bottom rod, the third bottom rod, and the fourth bottom rod contract to drive the second connecting member to move upward, so that the first support stand columns, the second support stand columns, and the third support stand columns contract, and the second bottom rod, the third bottom rod, and the fourth bottom rod contract. The cart occupies small space after being folded, and is thus convenient to store and carry. In addition, the underframe structure of the cart is connected to the lower portions of the first, second and third support stand columns, and three underframe assemblies are arranged, so that the cart frame body has a stable and strong overall structure, with strong load capacity and great practicality.

Additional aspects and advantages of the invention are to be partially provided in the following description, and partially become evident in the following description, or understood through the practice of the invention.

BRIEF DESCRIPTION OF THE DRAWINGS

The drawings described herein are provided for further understanding of the present invention, and constitute a part of the present disclosure. The exemplary embodiments of the present invention and illustrations thereof are intended to explain the present invention, but do not constitute inappropriate limitations to the present invention. In the accompanying drawings.

DETAILED DESCRIPTION OF THE EMBODIMENTS

Figure 1:
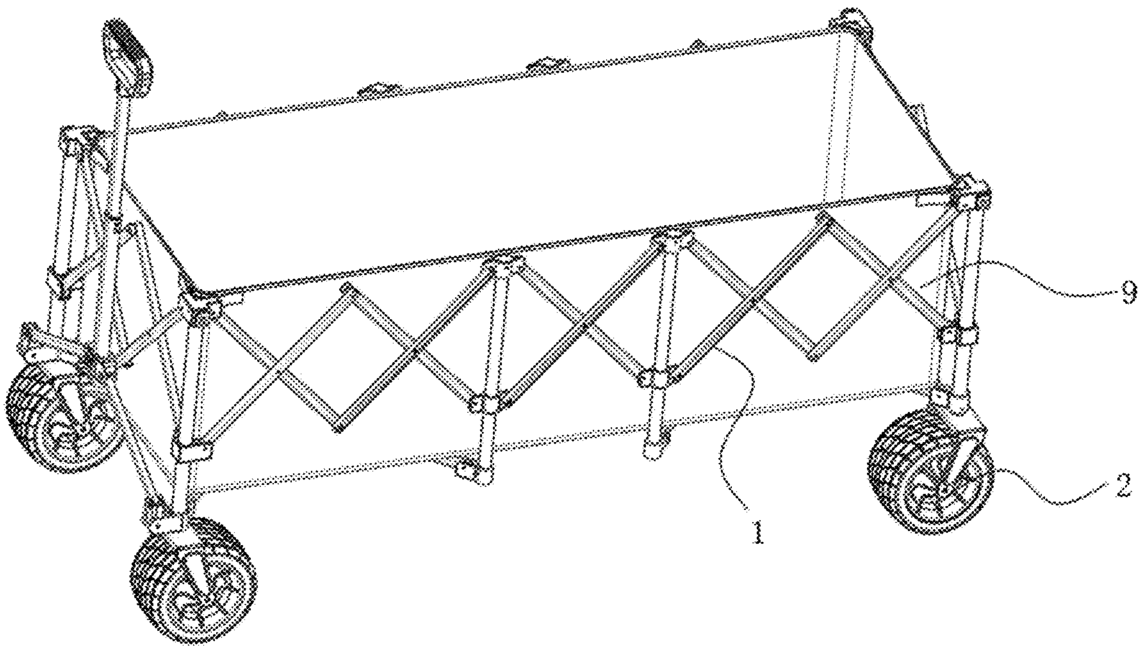
FIG. 1 is a schematic structural diagram of a sheaflike folding cart according to an example of the present invention.

In order to make the objectives, technical solutions and advantages of the embodiments of the present invention clearer, the technical solutions in the embodiments of the present invention are clearly and completely described below with reference to the drawings in the embodiments of the present invention. Apparently, the described embodiments are part, rather than all of the embodiments of the present invention. All other embodiments obtained by those of ordinary skill in the art based on the embodiments described in the present invention without creative efforts shall fall within the protection scope of the present invention.

In the description of the present invention, it should be understood that orientations or position relationships indicated by terms “upper”, “lower”, “front”, “rear”, “left”, “right”, “top”, “bottom”, “inside”, “outside”, etc. are orientation or position relationships as shown in the drawings, and these terms are just used to facilitate description of the invention and simplify the description, but not to indicate or imply that the mentioned device or elements must have a specific orientation and must be established and operated in a specific orientation, and thus, these terms cannot be understood as a limitation to the invention.

In the present invention, unless otherwise clearly specified, the terms "provided", "connected with", "connected to", and "fixed" should be understood in a broad sense. For example, the connection may be a fixed connection, a detachable connection or an integrated connection, may be a mechanical connection or an electrical connection, may be a direct connection or an indirect connection with use of an intermediate medium, or may be intercommunication between two components. A person of ordinary skill in the art can understand specific meanings of the terms in the present invention according to specific situations.

In the present invention, unless otherwise expressly specified and defined, a first feature being "above" or "below" a second feature may include not only direct contact between the first and second, features but also indirect contact between the first and second features via another feature between them. Furthermore, a first feature being "above" a second feature includes the first feature being directly above and diagonally above the second feature, or simply means that the first feature is higher in level than the second feature. Furthermore, a first feature being "below" a second feature includes the first feature being directly below and diagonally below the second feature, or simply means that the first feature is lower in level than the second feature.

Unless otherwise defined, the technical terms or scientific terms used herein shall have the common meanings as understood by those skilled in the art to which the present invention pertains. "First", "second" and similar words used in the specification and in the claims of the present invention patent do not denote any order, quantity or importance, but are merely intended to distinguish between different constituents. Also, the terms such as "a", "an", and the like are not intended to limit the amount, but indicate the existence of at least one.

Figure 2:
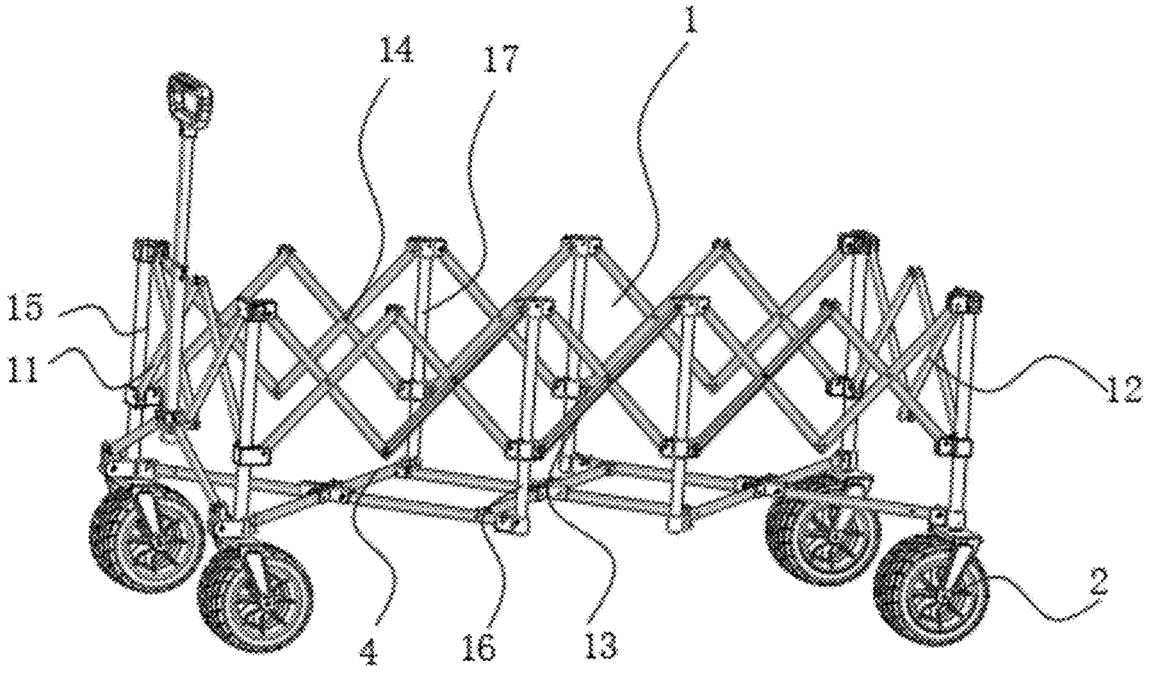
FIG. 2 is a schematic diagram of a partial structure of a sheaflike folding cart according to an example of the present invention.
Figure 3:
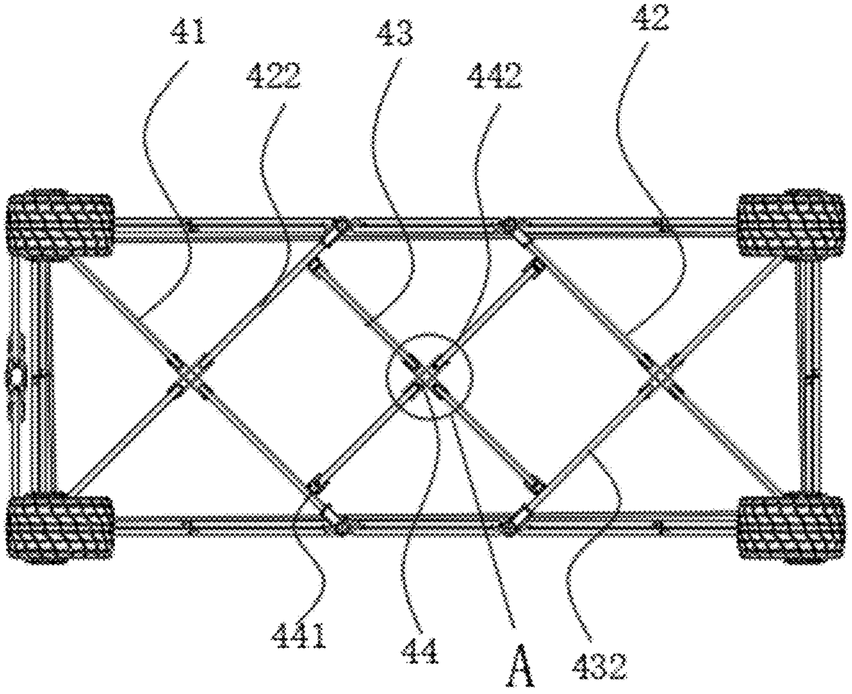
FIG. 3 is a schematic diagram of a bottom structure according to an example of the present invention.

As shown in FIGS. 1-3, as an embodiment of the present invention, the sheaflike folding cart includes a cart frame body 1 and a wheel body assembly 2 for diving the cart frame body to move, where the cart frame body 1 includes a front shear fork group 11, a rear shear fork group 12, a left shear fork group 13, and a right shear fork group 14, and also includes a first support stand column 15 rotatably connected to end portions of two adjacent shear fork groups, second support stand columns 16 rotatably connected to the left shear fork group 13, third support stand columns 17 rotatably connected to the right shear fork group 14, and an underframe structure 4 connected between lower portions of the first support stand columns 15, the second support stand columns 16 and the third support stand columns 17; the second support stand columns 16 and the third support stand columns 17 are oppositely arranged in two groups, and the underframe structure 4 includes a first underframe assembly 41 disposed between lower portions of one of the second support stand columns 16 and one of the third support stand columns 17 oppositely arranged, and lower portions of the first support stand columns 15 at two ends of the front shear fork group 11, a second underframe assembly 42 disposed between lower portions of the other of the second support stand columns 16 and the other of the third support stand columns 17 oppositely arranged, and lower portions of the first support stand columns 15 at two ends of the rear shear fork group 12, and a third underframe assembly 43 disposed between the first underframe assembly 41 and the second underframe assembly 42; and the first underframe assembly 41 and the second underframe assembly 42 are each provided with a second bottom rod 422 rotatably connected to the lower portion of the second support stand column 16 and a third bottom rod 432 rotatably connected to the lower portion of the third support stand column 17, the third underframe assembly 43 is provided with a second connecting member 44, a fourth mounting member 441 respectively connected to the second bottom rod 422 and the third bottom rod 432, and a fourth bottom rod 442 with two ends rotatably connected to the second connecting member 48 and the fourth mounting member 441 respectively. According to the sheaflike folding cart in this embodiment, the second support stand columns 16 and the third support stand columns 17 are oppositely arranged in two groups, and the underframe structure includes a first underframe assembly 41 disposed between lower portions of one of the second support stand columns 16 and one of the third support stand columns 17 oppositely arranged, and lower portions of the first support stand columns 15 at two ends of the front shear fork group, a second underframe assembly 42 disposed between lower portions of the other of the second support stand columns 16 and the other of the third support stand columns 17 oppositely arranged, and lower portions of the first support stand columns 15 at two ends of the rear shear fork group 14, and a third underframe assembly 43 disposed between the first underframe assembly 412 and the second underframe assembly 422. Compared with a cart without second and third support stand columns in the prior art, the length of the storage space of the cart frame body is greatly lengthened so that some longer items can be carried. In the meanwhile, the third underframe assembly 43 is provided with a second connecting member 44, a fourth mounting member 441 respectively connected to the second bottom rod 422 and the third bottom rod 432 of the first underframe assembly 41 and the second underframe assembly 42, and a fourth bottom rod 442 with two ends rotatably connected to the second connecting member 44 and the fourth mounting member 441 respectively, and when the sheaflike folding cart is driven to fold, the front, rear, left, and right shear fork groups are deformed to drive the first support stand columns, the second support stand columns, and the third support stand columns to contract, and the second bottom rod, the third bottom rod, and the fourth bottom rod contract to drive the second connecting member to move upward, so that the first support stand columns, the second support stand columns, and the third support stand columns contract, and the second bottom rod, the third bottom rod, and the fourth bottom rod contract. The cart occupies small space after being folded, and is thus convenient to store and carry. In addition, the underframe structure of the cart is connected to the lower portions of the first, second and third support stand columns, and three underframe assemblies are arranged, so that the cart frame body has a stable and strong overall structure, with strong load capacity and great practicality.

In another embodiment, as shown in FIG. 3, the second connecting member 44 is provided with four second connecting portions 443 respectively used for connecting the four fourth bottom rods 442, each second connecting portion 443 includes two second connecting side plates 444 arranged oppositely in a longitudinal direction and a second connecting top plate 445 connected between upper portions of the two second connecting side plates 444, the two second connecting side plates 444 and the second connecting top plate 445 enclose a second connecting groove 446 for arrangement of one end of the fourth bottom rod, and during folding, through rotary fitting with the fourth mounting member 441, the fourth bottom rod 442 can be limited, so that folding is easier, and the structure after folding is more compact; and the second connecting side plate 444 is rotatably connected to the fourth bottom rod 442 through a second connecting shaft 447.

Figure 5:
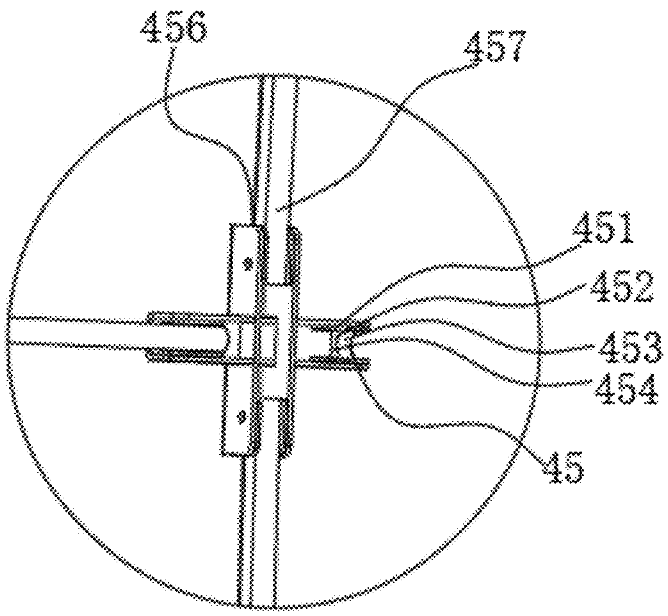
FIG. 5 is a schematic structural diagram of a second connecting member according to an example of the present invention.
Figure 6:
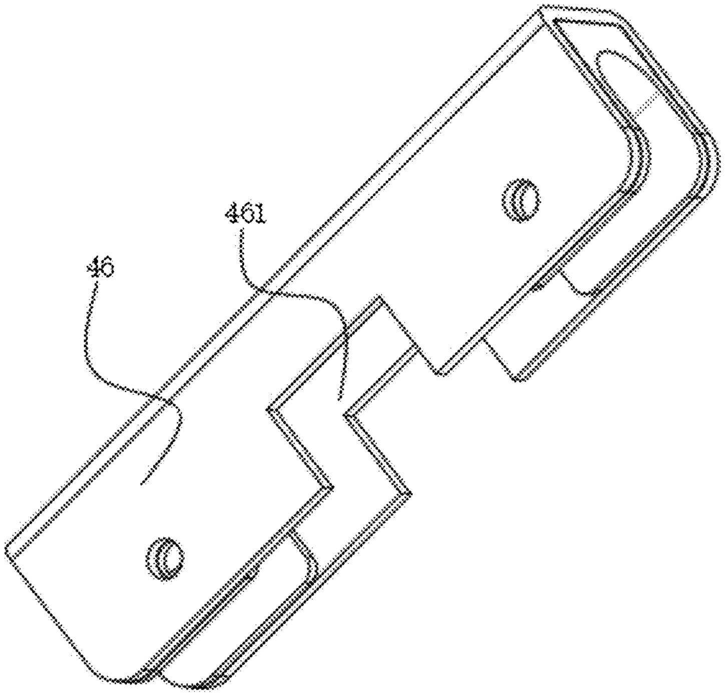
FIG. 6 is a schematic structural diagram of a first connecting strip according to an example of the present invention.
Figure 7:
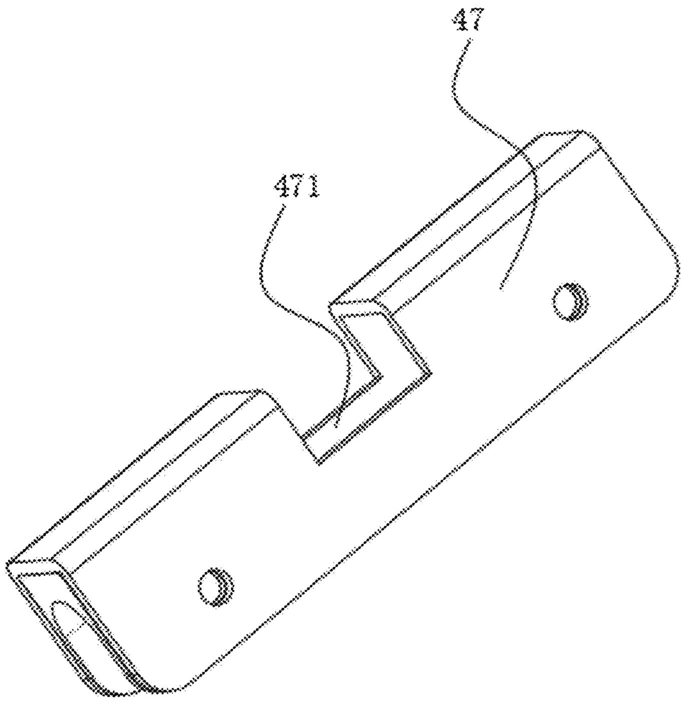
FIG. 7 is a schematic structural diagram of a second connecting strip according to an example of the present invention.

As shown in FIG. 5, the second connecting portion 443 also includes a second limiting member 45 fixedly connected to an inner side of the second connecting groove 446, the second limiting member 45 includes second limiting plates 451 respectively arranged on inner sides of the two second connecting side plates 444, and a second limiting portion 452 connected between upper portions of the two second limiting plates 451, the second limiting portion 452 is arranged at one end of the second connecting side plate 444 close to the support stand column, the second connecting shaft 447 is arranged at one end of the second connecting side plate 444 away from the support stand column, the second limiting portion is provided with a third limiting surface 453 at a bottom and a fourth limiting surface 454 close to one side of the second connecting shaft 447, an outer side of the fourth bottom rod 442 is provided with a third abutting surface 456 and a fourth abutting surface 457 arranged at intervals on one side of the third abutting surface 456 away from the support stand column, when the sheaflike folding cart is driven to unfold, the third abutting surface 456 can abut against the third limiting surface 453 for limiting, so that the three-underframe structures of the cart are in the same plane for smooth loading, and thus loading is more stable; and when the sheaflike folding cart is driven to fold, the fourth abutting surface 457 can abut against the fourth limiting surface 454 for limiting, so that the distance between the bottom rods after folding is shortened, thus avoiding the wear caused by mutual interference and collision.

Figure 4:
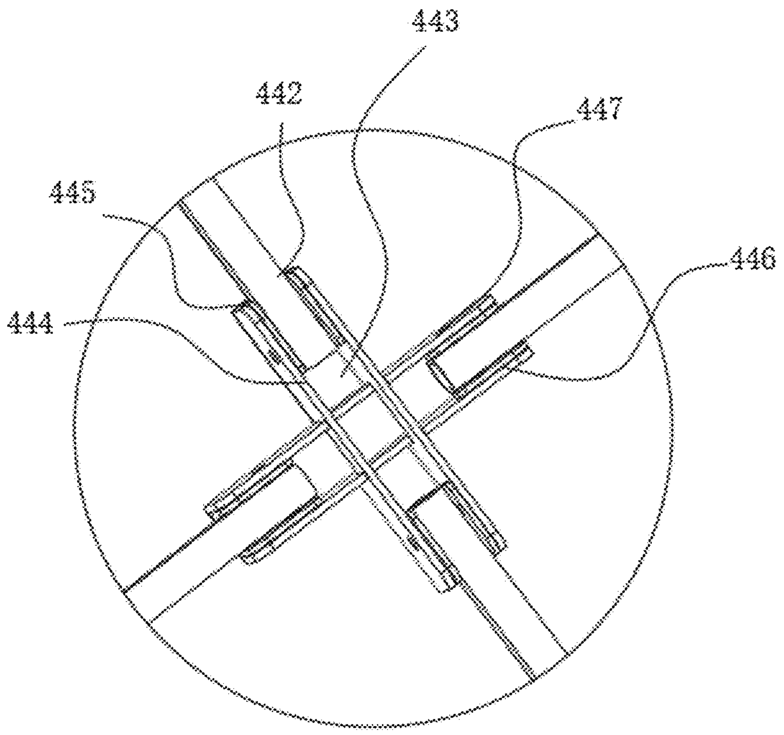
FIG. 4 is an enlarged view of position A in FIG. 3.

As shown in FIG. 4, the second connecting member 44 includes a third connecting strip 46 and a fourth connecting strip 47 perpendicularly crossed with each other, a middle of the third connecting strip 46 is provided with a first lower opening portion 461, a middle of the fourth connecting strip is provided with a first upper opening portion 471, the first lower opening connecting portion 461 and the first upper opening connecting portion 471 are in snap fit, after fit, and a top surface of the third connecting strip 46 and a top surface of the fourth connecting strip 47 are located on a same plane and form a bearing support surface for abutting against a bottom of a cloth cover structure; the upper and lower opening portion are designed for labor-saving during disassembly and less space occupation during storage, and do not offset when matching, ensuring that the structure is complete and reliable, and the load is more stable; and two ends of the third connecting strips and two ends of the four connecting strip are respectively formed into the second connecting portions 443.

As shown in FIG. 3, a length of the fourth bottom rod 442 is less than a length of the second bottom rod and a length of the third bottom rod, the fourth mounting member 441 is spaced from one end of the second bottom rod 422 close to the second support stand column 16 or one end of the third bottom rod 432 close to the third support stand column 17, the fourth mounting member 441 includes two fourth mounting side plates 48 arranged oppositely in a longitudinal direction, and a fourth connecting side plate 481 connected between ends of the two fourth mounting side plates 48 away from the fourth bottom rod, the fourth connecting side plate 48 is relatively fixedly connected to one side of the fourth bottom rod 442 close to the second connecting member 42, the two fourth mounting side plates 48 and the fourth connecting side plate 481 enclose a fourth mounting groove 482 for arrangement of one end portion of the fourth bottom rod 442, the fourth mounting side plate 48 is rotatably connected with the fourth bottom rod 442 through a fourth mounting shaft 483, and the fourth bottom rod 442 is perpendicular to the second bottom rod 422 or the third bottom rod 432 through the fourth mounting member 441. The three cross structures of the underframe are formed, which increases the support area of the underframe, reduces the support gap, and makes the support of the underframe more stable; and when covered with a cloth cover, the underframe can achieve more stable support, and has a larger load capacity.

Figure 8:
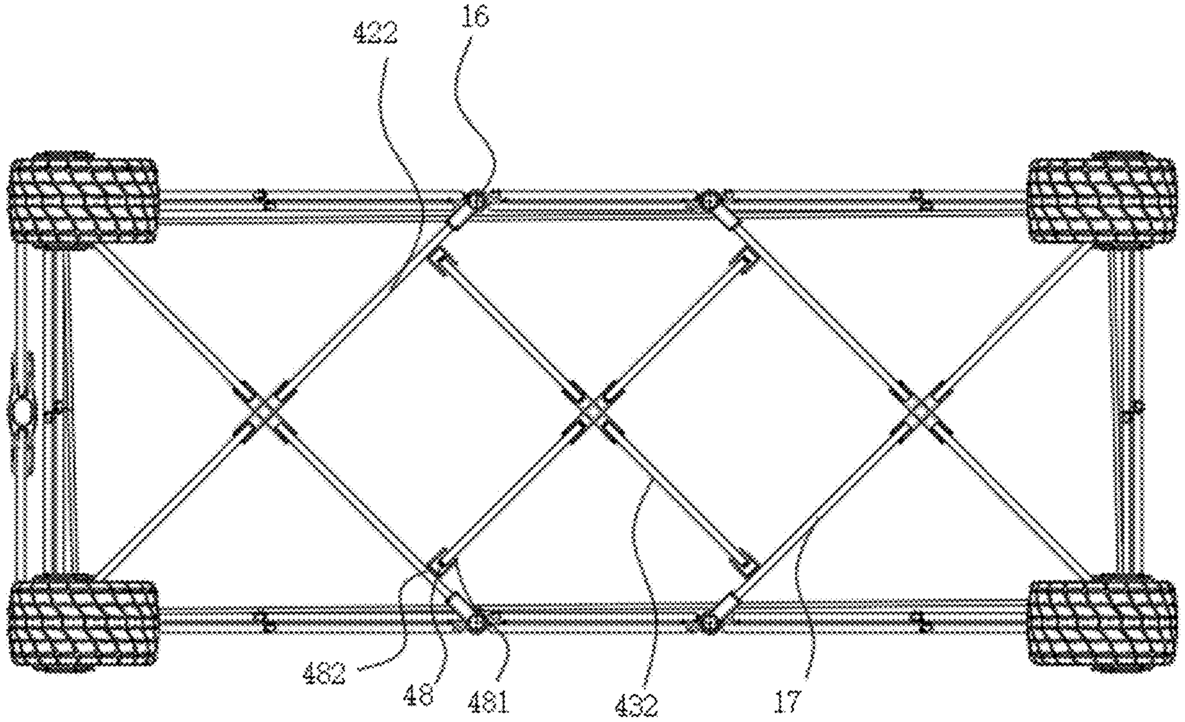
FIG. 8 is a schematic structural diagram of a fourth mounting member of a third underframe assembly according to an example of the present invention.
Figure 9:
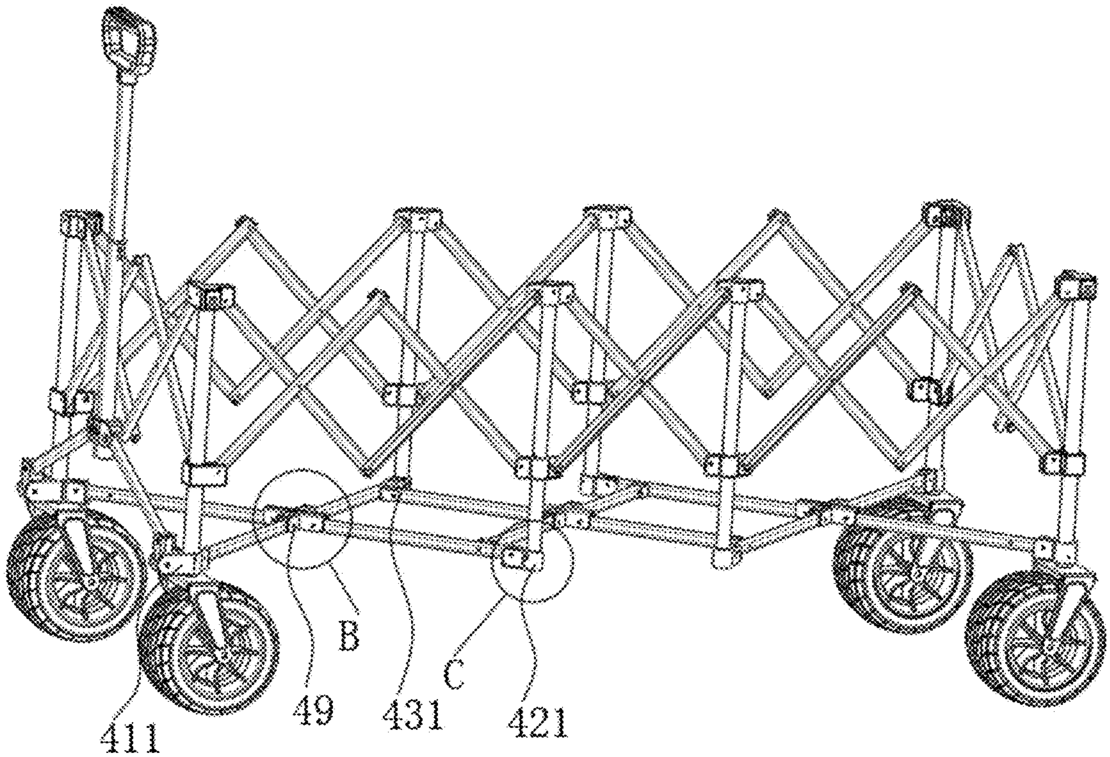
FIG. 9 is a diagram showing a use state of each mounting member according to an example of the present invention.

As shown in FIG. 8 and FIG. 9, the first underframe assembly 41 and the second underframe assembly 42 are further each provided with a first mounting member 411 connected to the lower portion of each first support stand column 15, a second mounting member 421 connected to the lower portion of each second support stand column 16, a third mounting member 431 connected to the lower portion of each third support stand column 17, a first connecting member 49, and a first bottom rod 412 with two ends rotatably connected to a lower side of the first connecting member 49 and an upper side of the first mounting member 411 respectively, two ends of the second bottom rod 412 are rotatably connected to the lower side of the first connecting member 49 and an upper side of the second mounting member 421 respectively, two ends of the third bottom rod 432 are respectively rotatably connected to the lower side of the first connecting member 49 and an upper side of the third mounting member 431, and when the sheaflike folding cart is driven to fold, the first bottom rod 412, the second bottom rod 422, and the third bottom rod 432 contract to drive the first connecting member 49 to move upward, so as to fold and deform together, thereby making folding easier and more labor saving.

Figure 10:
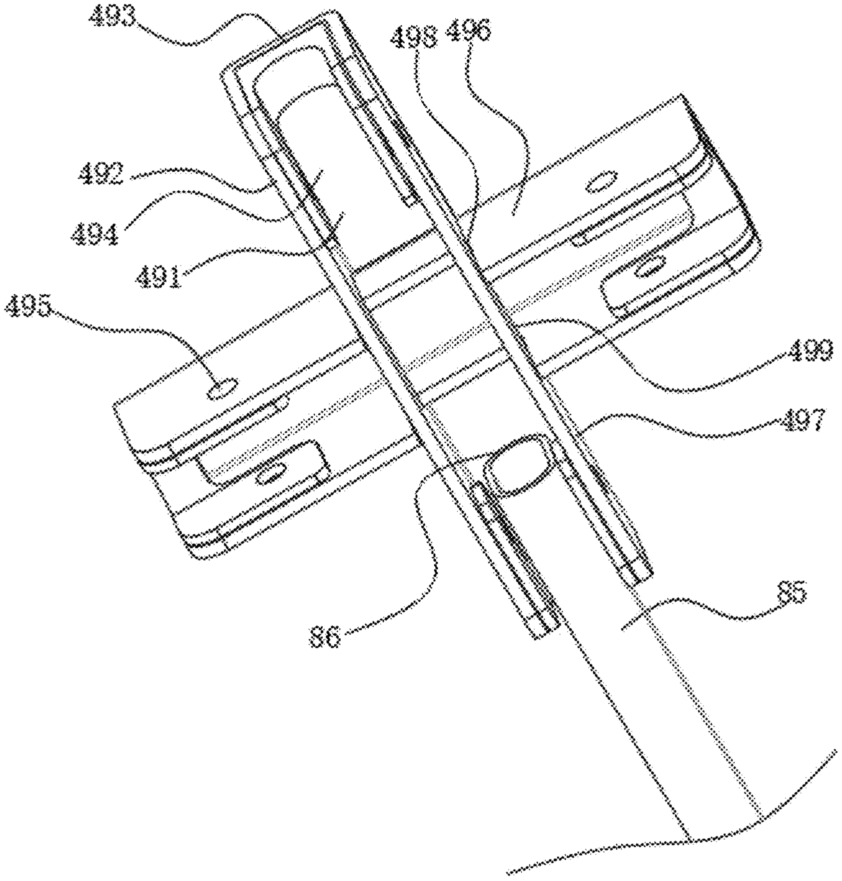
FIG. 10 is an enlarged view of position B in FIG. 9.

As shown in FIG. 10, the first connecting member 49 is provided with four first connecting portions 491 respectively used for connecting the two first bottom rods 412, the second bottom rod 422 and the third bottom rod 432, each first connecting portion 491 includes two first connecting side plates 492 arranged oppositely in a longitudinal direction and a first connecting top plate 493 connected between upper portions of the two first connecting side plates 492, the two first connecting side plates 492 and the first connecting top plate 493 enclose a first connecting groove 494 for arrangement of an end portion of the bottom rod, and the first connecting side plate 492 is rotatably connected to the bottom rod through a first connecting shaft 495. The first connecting portion 491 also includes a first limiting member 8 fixedly connected to an inner side of the first connecting groove 494, the first limiting member 8 includes first limiting plates 81 respectively arranged on inner sides of the two first connecting side plates 492, and a first limiting portion 82 connected between upper portions of the two first limiting plates 81, the first limiting portion 82 is arranged at one end of the first connecting side plate 492 close to the support stand column, the first connecting shaft 495 is arranged at one end of the first connecting side plate 492 away from the support stand column, the first limiting portion 82 is provided with a first limiting surface 83 at a bottom and a second limiting surface 84 close to one side of the first connecting shaft, an outer side of the fourth bottom rod is provided with a first abutting surface 85 and a 86 abutting surface arranged at intervals on one side of the first abutting surface 85 away from the support stand column, when the support frame is driven to unfold, the first abutting surface 85 can abut against the first limiting surface 83 for limiting, so that the bottom rod is parallel to the first connecting member in a limiting manner to form a flat support surface; and when the cart frame body is driven to fold, the second abutting surface 86 can abut against the second limiting surface 84 for limiting, so that the gap between the bottom rods is reduced, and the cart occupies less space when folded as a whole. As shown in FIG. 8, the first connecting member 49 includes a first connecting strip 496 and a second connecting strip 497 perpendicularly crossed with each other, a middle of the first connecting strip 496 is provided with a lower opening portion 498, a middle of the second connecting strip 497 is provided with an upper opening portion 499, the lower opening connecting portion 498 and the upper opening connecting portion 499 are in snap fit, after fit, and a top surface of the first connecting strip 496 and a top surface of the second connecting strip 497 are located on a same plane and form a bearing support surface for abutting against a bottom of a cloth cover structure 5; and two ends of the third connecting strips and two ends of the four connecting strip are respectively formed into the first connecting portions 491. The upper and lower opening portion are designed for labor-saving during disassembly and less space occupation during storage, and do not offset when matching, ensuring that the structure is complete and reliable, and the load is more stable.

Figure 11:
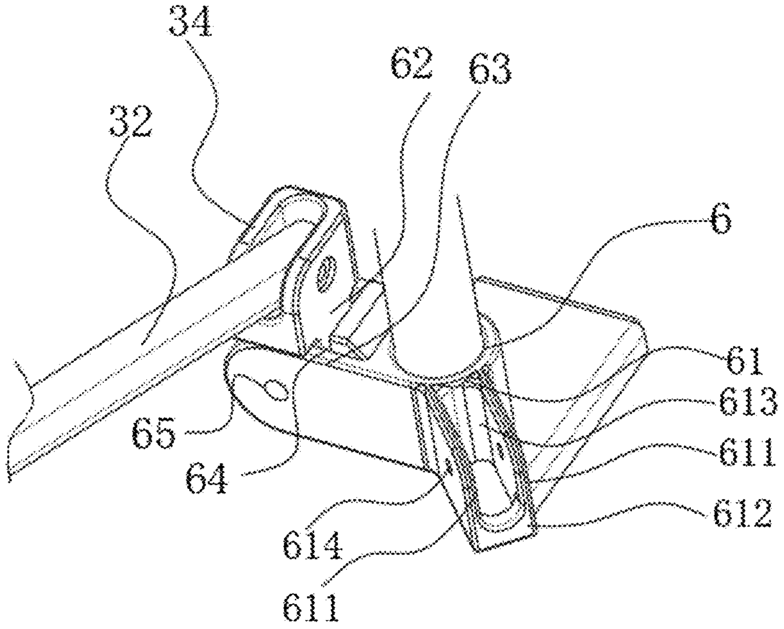
FIG. 11 is a schematic structural diagram of a first mounting member according to an example of the present invention.
Figure 12:
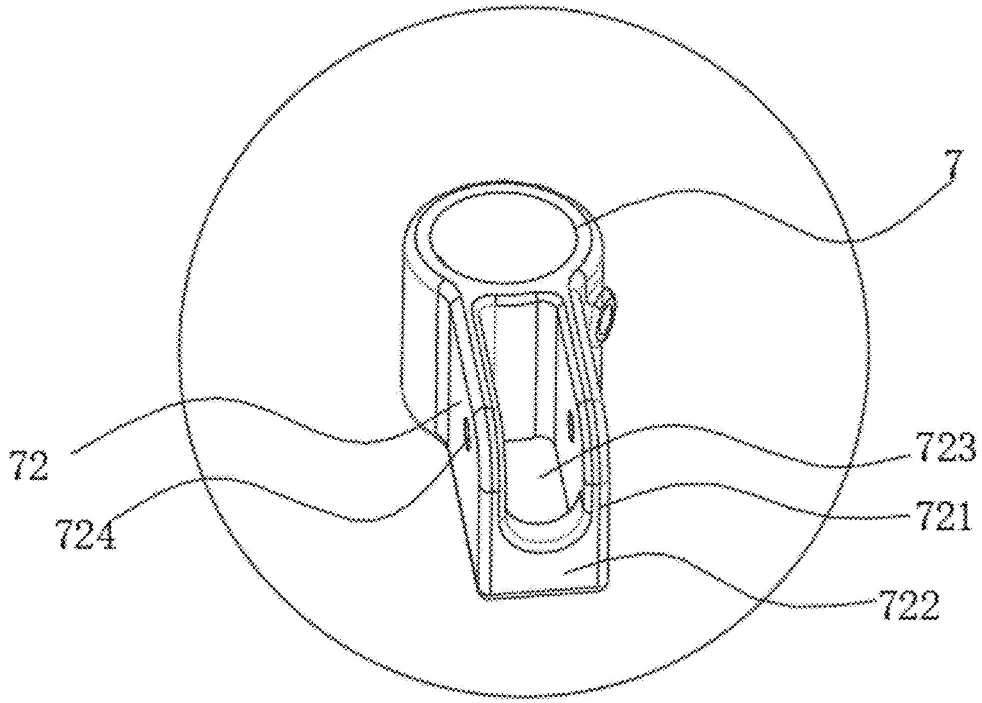
FIG. 12 is an enlarged view of position C in FIG. 9.

As shown in FIG. 11 and FIG. 12, the first mounting member 411 includes a first mounting base portion 6 sleeving and being relatively fixed to the lower portion of the first support stand column 15, and a first mounting portion 61 connected to one side of the first mounting base portion 6. The first mounting portion 61 includes two first mounting side plates 611 arranged oppositely in a longitudinal direction, and a first mounting bottom plate 612 connected between lower portions of the two first mounting side plates 611, the two first mounting side plates 611 and the first mounting bottom plate 612 enclose a first mounting groove 613 for arrangement of an end portion of the first bottom rod 412, and the first mounting side plates 611 are rotatably connected with the first bottom rod 412 through a first mounting shaft 614. The second mounting portion 62 is connected to the other side of the first mounting base portion 6, and the first mounting portion 61 is rotatably connected with the first bottom rod 412. The second mounting portion 62 includes two second mounting side plates 63 arranged oppositely in a longitudinal direction, and the two second mounting side plates 63 enclose a second mounting groove 64. A pull handle assembly 3 includes a pull handle rod 31, two connecting rods 32 arranged on two sides of the pull handle rod 31 respectively, a first connecting structure 33 connected between a lower portion of the pull handle rod 31 and upper ends of the two connecting rods 32, and a second connecting structure 34 connected between lower ends of the two connecting rods 32 and the two second mounting portions 62 respectively. The pull handle rod 31 includes a pull handle lower rod 311 and a pull handle upper rod 312 telescopically sleeved in the pull handle lower rod 311. The pull handle lower rod 311 and the pull handle upper rod 312 are telescopically positioned through a second positioning assembly 313. An upper end of the pull handle upper rod 31 is connected to a handle member, and the second positioning assembly 313 includes a second elastic member 314 connected to the pull handle upper rod 312, and a second positioning channel 315 formed on the pull handle lower rod 311 and allowing the second elastic member 314 to partially protrude out of the pull handle lower rod 311. Two ends of the connecting rod 32 are rotatably connected with the first connecting structure 33 and the second connecting structure 34 through a transversely arranged rotating shaft respectively. A lower portion of the second connecting structure 34 is located in the second mounting groove 64 and is rotatably connected with the second mounting side plate 63 through a second mounting shaft 65. The rotating shaft is arranged in a length direction of the cart frame body, and the second mounting shaft 65 is arranged in a width direction of the cart frame body, so that the handle can rotate relative to a front body frame base to adjust the pulling angle, thereby ensuring the cart is more convenient and flexible to turn when pushed.

The second and third mounting members each include a second mounting base portion 7 sleeving and being relatively fixed to the lower portions of the second and third support stand columns, and a third mounting portion 72 connected to a side portion of the second mounting base portion 7, the third mounting portion 72 includes two third mounting side plates 721 arranged oppositely in a longitudinal direction, and a third mounting bottom plate 722 connected between lower portions of the two third mounting side plates 721, the two third mounting side plates 721 and the third mounting bottom plate 722 enclose a third mounting groove 723 for arrangement of end portions of the second and third bottom rods, and the third mounting side plates 721 are rotatably connected with the second and third bottom rods through a third mounting shaft 724, so that the second and third bottom rods are limited, the bottom rods do not interfere with each other during folding, the gap between the bottom rods after folding is reduced, and meanwhile, the storage space is decreased.

Figure 13:
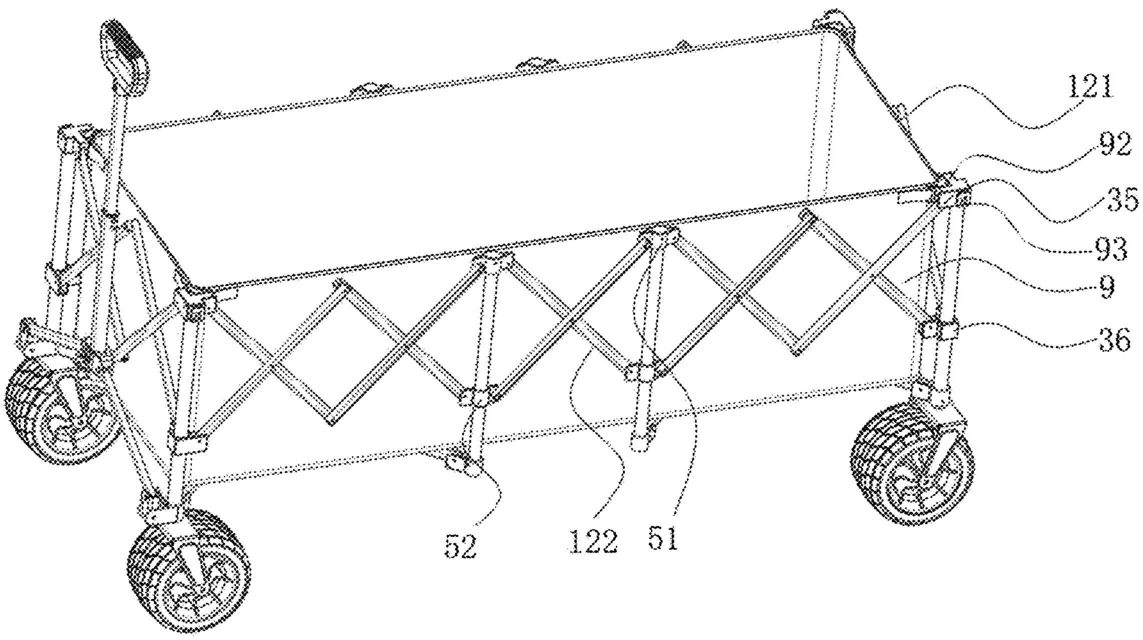
FIG. 13 is a schematic diagram of a cloth cover quick-release structure according to an example of the present invention.
Figure 14:
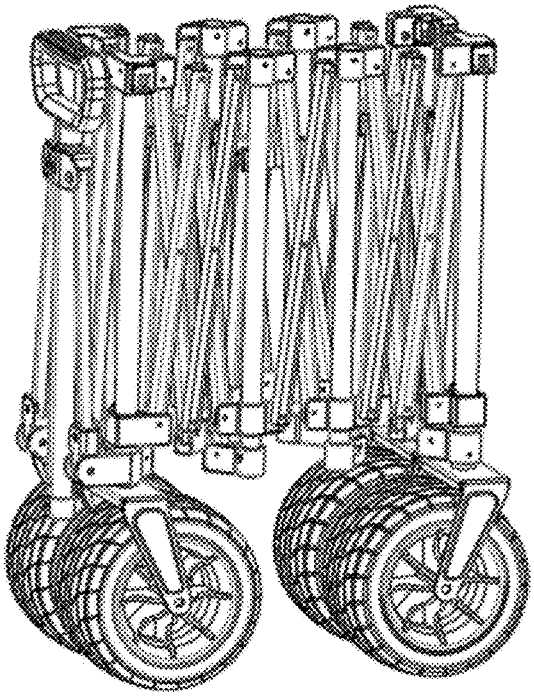
FIG. 14 is a diagram showing a folding and unfolding state of a folding cart according to an example of the present invention.

FIG. 13 shows a cloth cover structure 9 mounted in the cart frame body. The left and right shear fork groups are provided with end shear fork brackets 121 arranged on two ends thereof and an intermediate shear fork bracket 122 arranged between the two end shear fork brackets; a third connecting structure 35 is fixedly connected to an upper portion of the first support stand column 15, a fourth connecting structure 36 is slidably connected to a lower portion of the first support stand column, upper portions of two ends of the front and rear shear fork groups, and upper portions of the ends of the end shear fork brackets 121 of the left and right shear fork groups away from the intermediate shear fork bracket 122 are rotatably connected with correspondingly arranged third connecting structures 35 respectively, lower portions of two ends of the front and rear shear fork groups, and lower portions of the ends of the end shear fork brackets of the left and right shear fork groups away from the intermediate shear fork bracket are rotatably connected with correspondingly arranged fourth connecting structures 36 respectively, and during folding, the shear fork groups are more convenient and easier to change on the first support stand column 15. The cloth cover structure 9 is provided with a first mounting buckle 91 arranged corresponding to the third connecting structure 35, an inner side of the third connecting structure 35 is provided with a first quick-release buckle 92 detachably connected with the first mounting buckle 91 to facilitate assembly or disassembly of a cloth cover, and an outer side of the third connecting structure 35 is provided with a second quick-release buckle 93 for connecting accessories such as table boards and roofs to facilitate assembly or disassembly of the connecting accessories such as table boards and roofs.

A fifth connecting structure 51 is fixedly connected to upper portions of the second and third support stand columns, a sixth connecting structure 52 is slidably connected to lower portions of the second and third support stand columns, upper portions of two ends of the intermediate shear fork bracket 122 of the left and right shear fork groups, and upper portions of the ends of the end shear fork brackets 121 close to the intermediate shear fork bracket 122 are rotatably connected with correspondingly arranged fifth connecting structures 51 respectively, and lower portions of two ends of the intermediate shear fork bracket of the left and right shear fork groups, and lower portions of the ends of the end shear fork brackets close to the intermediate shear fork bracket are rotatably connected with correspondingly arranged sixth connecting structures 52 respectively. In this way, it is more convenient and easier to change the shear fork groups on the second and third support stand columns during folding.

Finally, it should be noted that the above embodiments are only used to illustrate the technical solutions of the present invention rather than limiting thereto. Although the present invention has been described in detail with reference to the foregoing embodiments, a person of ordinary skill in the art should understand that the technical solutions recited in the foregoing embodiments may still be modified, or some of the technical features thereof may be replaced with equivalents. These modifications or replacements do not make the essence of the corresponding technical solution deviate from the scope of the technical solutions in the embodiments of the present invention.

In summary, the foregoing descriptions are only preferred embodiments of the present invention, and all equivalent changes and modifications made in accordance with the patent claims of the present invention shall fall within the scope of the present invention patent.

What is claimed is:

1. A sheaflike folding cart, comprising a cart frame body and a wheel body assembly for driving the cart frame body to move, wherein the cart frame body comprises a front shear fork group, a rear shear fork group, a left shear fork group, and a right shear fork group, and also comprises a first support stand column rotatably connected to end portions of two adjacent shear fork groups, a second support stand column rotatably connected to the left shear fork group, a third support stand column rotatably connected to the right shear fork group, and an underframe structure connected between lower portions of each first support stand column, second support stand column and the third support stand column;

the second support stand column and the third support stand column are oppositely arranged in two groups, and the underframe structure comprises a first underframe assembly disposed between lower portions of one of the second support stand columns and one of the third support stand columns oppositely arranged, and lower portions of the first support stand columns at two ends of the front shear fork group, a second underframe assembly disposed between lower portions of the other of the second support stand columns and the other of the third support stand columns oppositely arranged, and lower portions of the first support stand columns at two ends of the rear shear fork group, and a third underframe assembly disposed between the first underframe assembly and the second underframe assembly; and the first underframe assembly and the second underframe assembly are each provided with a second bottom rod rotatably connected to the lower portion of the second support stand column and a third bottom rod rotatably connected to the lower portion of the third support stand column, the third underframe assembly is provided with a second connecting member, a fourth mounting member respectively connected to the second bottom rod and the third bottom rod, and a fourth bottom rod with two ends rotatably connected to the second connecting member and the fourth mounting member respectively, and when the sheaflike folding cart is driven to fold, the front, rear, left, and right shear fork groups are deformed to drive the first support stand columns, the second support stand columns, and the third support stand columns to contract, and the second bottom rod, the third bottom rod, and the fourth bottom rod contract to drive the second connecting member to move upward.

2. The sheaflike folding cart according to claim 1, wherein the second connecting member is provided with four second connecting portions respectively used for connecting the four fourth bottom rods, each second connecting portion comprises two second connecting side plates arranged oppositely in a longitudinal direction and a second connecting top plate connected between upper portions of the two second connecting side plates, the two second connecting side plates and the second connecting top plate enclose a second connecting groove for arrangement of one end of the fourth bottom rod, and the second connecting side plate is rotatably connected to the fourth bottom rod through a second connecting shaft.

3. The sheaflike folding cart according to claim 2, wherein the second connecting portion also comprises a second limiting member fixedly connected to an inner side of the second connecting groove, the second limiting member comprises second limiting plates respectively arranged on inner sides of the two second connecting side plates, and a second limiting portion connected between upper portions of the two second limiting plates, the second limiting portion is arranged at one end of the second connecting side plate close to the support stand column, the second connecting shaft is arranged at one end of the second connecting side plate away from the support stand column, the second limiting portion is provided with a third limiting surface at a bottom and a fourth limiting surface close to one side of the second connecting shaft, an outer side of the fourth bottom rod is provided with a third abutting surface and a fourth abutting surface arranged at intervals on one side of the third abutting surface away from the support stand column, when the sheaflike folding cart is driven to unfold, the third abutting surface is capable of abutting against the third limiting surface for limiting, and when the sheaflike folding cart is driven to fold, the fourth abutting surface is capable of abutting against the fourth limiting surface for limiting.

4. The sheaflike folding cart according to claim 2, wherein the second connecting member comprises a third connecting strip and a fourth connecting strip perpendicularly crossed with each other, a middle of the third connecting strip is provided with a first lower opening portion, a middle of the fourth connecting strip is provided with a first upper opening portion, the first lower opening connecting portion and the first upper opening connecting portion are in snap fit, after fit, a top surface of the third connecting strip and a top surface of the fourth connecting strip are located on a same plane and form a bearing support surface for abutting against a bottom of a cloth cover structure, and two ends of the third connecting strips and two ends of the four connecting strip are respectively formed into the second connecting portions.

5. The sheaflike folding cart according to claim 1, wherein a length of the fourth bottom rod is less than a length of the second bottom rod and a length of the third bottom rod, the fourth mounting member is spaced from one end of the second bottom rod close to the second support stand column or one end of the third bottom rod close to the third support stand column, the fourth mounting member comprises two fourth mounting side plates arranged oppositely in a longitudinal direction, and a fourth connecting side plate connected between ends of the two fourth mounting side plates away from the fourth bottom rod, the fourth connecting side plate is relatively fixedly connected to one side of the fourth bottom rod close to the second connecting member, the two fourth mounting side plates and the fourth connecting side plate enclose a fourth mounting groove for arrangement of one end portion of the fourth bottom rod, the fourth mounting side plate is rotatably connected with the fourth bottom rod through a fourth mounting shaft, and the fourth bottom rod is perpendicular to the second bottom rod or the third bottom rod through the fourth mounting member.

6. The sheaflike folding cart according to claim 1, wherein the first underframe assembly and the second underframe assembly are further each provided with a first mounting member connected to the lower portion of each first support stand column, a second mounting member connected to the lower portion of each second support stand column, a third mounting member connected to the lower portion of each third support stand column, a first connecting member, and a first bottom rod with two ends rotatably connected to a lower side of the first connecting member and an upper side of the first mounting member respectively, two ends of the second bottom rod are rotatably connected to the lower side of the first connecting member and an upper side of the second mounting member respectively, two ends of the third bottom rod are respectively rotatably connected to the lower side of the first connecting member and an upper side of the third mounting member, and when the sheaflike folding cart is driven to fold, the first bottom rod, the second bottom rod, and the third bottom rod contract to drive the first connecting member to move upward.

7. The sheaflike folding cart according to claim 6, wherein the first connecting member is provided with four first connecting portions respectively used for connecting the two first bottom rods, the second bottom rod and the third bottom rod, each first connecting portion comprises two first connecting side plates arranged oppositely in a longitudinal direction and a first connecting top plate connected between upper portions of the two first connecting side plates, the two first connecting side plates and the first connecting top plate enclose a first connecting groove for arrangement of an end portion of the bottom rod, and the first connecting side plate is rotatably connected to the bottom rod through a first connecting shaft.

8. The sheaflike folding cart according to claim 7, wherein the first connecting member comprises a first connecting strip and a second connecting strip perpendicularly crossed with each other, a middle of the first connecting strip is provided with a lower opening portion, a middle of the second connecting strip is provided with an upper opening portion, the lower opening connecting portion and the upper opening connecting portion are in snap fit, after fit, a top surface of the first connecting strip and a top surface of the second connecting strip are located on a same plane and form a bearing support surface for abutting against a bottom of a cloth cover structure, and two ends of the first connecting strips and two ends of the second connecting strip are respectively formed into the first connecting portions.

9. The sheaflike folding cart according to claim 8, wherein the first mounting member comprises a first mounting base portion sleeving and being relatively fixed to the lower portion of the first support stand column, and a first mounting portion connected to one side of the first mounting base portion, the first mounting portion comprises two first mounting side plates arranged oppositely in a longitudinal direction, and a first mounting bottom plate connected between lower portions of the two first mounting side plates, the two first mounting side plates and the first mounting bottom plate enclose a first mounting groove for arrangement of an end portion of the first bottom rod, and the first mounting side plates are rotatably connected with the first bottom rod through a first mounting shaft; and the second and third mounting members each comprise a second mounting base portion sleeving and being relatively fixed to the lower portions of the second and third support stand columns, and a third mounting portion connected to a side portion of the second mounting base portion, the third mounting portion comprises two third mounting side plates arranged oppositely in a longitudinal direction, and a third mounting bottom plate connected between lower portions of the two third mounting side plates, the two third mounting side plates and the third mounting bottom plate enclose a third mounting groove for arrangement of end portions of the second and third bottom rods, and the third mounting side plates are rotatably connected with the second and third bottom rods through a third mounting shaft.

10. The sheaflike folding cart according to claim 1, further comprising the cloth cover structure mounted in the cart frame body, wherein the left and right shear fork groups are provided with end shear fork brackets arranged on two ends thereof and an intermediate shear fork bracket arranged between the two end shear fork brackets;

a third connecting structure is fixedly connected to an upper portion of the first support stand column, a fourth connecting structure is slidably connected to a lower portion of the first support stand column, upper portions of two ends of the front and rear shear fork groups, and upper portions of the ends of the end shear fork brackets of the left and right shear fork groups away from the intermediate shear fork bracket are rotatably connected with correspondingly arranged third connecting structures respectively, lower portions of two ends of the front and rear shear fork groups, and lower portions of the ends of the end shear fork brackets of the left and right shear fork groups away from the intermediate shear fork bracket are rotatably connected with correspondingly arranged fourth connecting structures respectively, the cloth cover structure is provided with a first mounting buckle arranged corresponding to the third connecting structure, an inner side of the third connecting structure is provided with a first quick-release buckle detachably connected with the first mounting buckle, and an outer side of the third connecting structure is provided with a second quick-release buckle for connecting accessories; and a fifth connecting structure is fixedly connected to upper portions of the second and third support stand columns, a sixth connecting structure is slidably connected to lower portions of the second and third support stand columns, upper portions of two ends of the intermediate shear fork bracket of the left and right shear fork groups, and upper portions of the ends of the end shear fork brackets close to the intermediate shear fork bracket are rotatably connected with correspondingly arranged fifth connecting structures respectively, and lower portions of two ends of the intermediate shear fork bracket of the left and right shear fork groups, and lower portions of the ends of the end shear fork brackets close to the intermediate shear fork bracket are rotatably connected with correspondingly arranged sixth connecting structures respectively.

* * * * *